July 28, 1964    J. W. BLACK    3,142,085
SWIVEL MECHANISM FOR A CASTER
Filed Feb. 13, 1963
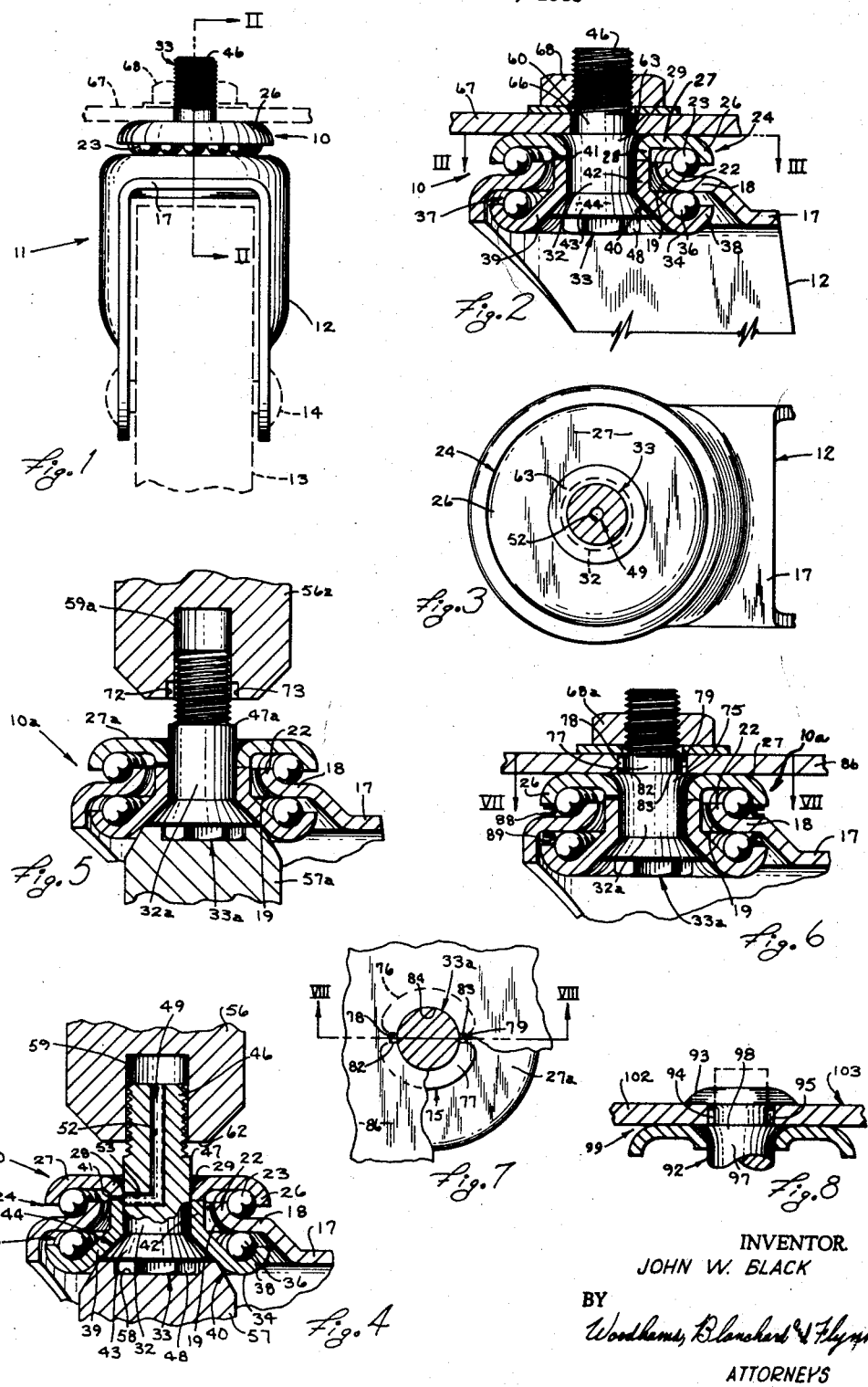
INVENTOR.
JOHN W. BLACK
BY
Woodhams, Blanchard & Flynn
ATTORNEYS

3,142,085
SWIVEL MECHANISM FOR A CASTER
John W. Black, Prairieville, Mich., assignor to Pemco Wheel Company, Kalamazoo, Mich., a corporation of Michigan
Filed Feb. 13, 1963, Ser. No. 258,207
16 Claims. (Cl. 16—21)

This invention relates in general to a swivel mechanism including a king pin and a bearing assembly for a swivel caster, and to a method for shaping the king pin while it is being connected to parts of the bearing assembly, so that said king pin and said bearing parts are thereby held together, and so that said caster can be nonrotatably connected by said king pin to the device which the caster supports.

Casters of the type having a spindle or king pin rotatably connected by an antifriction bearing assembly to the wheel supporting yoke of the caster have been in common use for many years. Moreover, the concept of threading the upper end of the king pin for the purpose of securing the king pin to the device supported by the caster is also well known in the art. In fact, my Patent No. 2,976,562 discloses one form of king pin and bearing construction by means of which these ends are presently accomplished.

However, in a continuing effort to improve upon existing structures of this character, it was discovered that certain parts of the swivel mechanisms of this type of caster failed much more frequently than did other parts of said swivel mechanisms. Specifically, it was found that, where the outer bearing ball retainers were secured to the king pin, said retainers often became loosened with respect to the king pin after a relatively short period of use due to forces which were applied radially of said king pin. Thus, although the swivel caster construction disclosed in said patent is a considerable improvement over the prior art constructions, the need for further improvement has become evident.

It was discovered that failures in the connection between the king pin and the bearing ball retainers could be greatly reduced by increasing and extending, both axially and radially, the areas of surface engagement between the king pin and said retainers. Moreover, it was also discovered that this result could be achieved by the use of substantially conical surfaces of mutual engagement on the king pin and on the outer ball retainers. That is, if the king pin is provided with a pair of spaced and substantially coaxial surfaces which converge toward each other, and if the ball retainers are provided with internal, annular surfaces engageable with the converging surfaces on the king pin, such engagement holds said ball retainers more firmly upon the king pin than is the case with previous constructions. Accordingly, the dual converging construction greatly increases the rigidity of the swivel construction and improves its ability to withstand the type of shocks which had, heretofore, resulted in failure of the swivel mechanism.

Incident to this discovery, it was also found that the new swivel construction and the method for producing it also could be adapted to provide an interlocking structure between the king pin and the device to which the king pin is attached for mounting the caster. Moreover, it was found that the improved swivel construction facilitates assembly of the caster and it also permits easy mounting of the caster upon the customer's structures without using special tools. Thus, this new caster construction can be supplied on very short notice as a replacement part where an existing caster construction of the same type requires replacement due to fair wear and tear. The additional strength in the swivel mechanism embodying the instant invention provides a safety factor sufficient to permit the manufacturer to guarantee satisfactory operation and relatively long life under conditions where existing swivel mechanisms for the same purpose have frequently failed.

As a general rule, plate-type casters are constructed with king pins having their heads secured to, and/or on top of, the plate. Thus, it is necessary to start the assembly of each such caster by first inserting the king pin through the plate and then adding the bearing assembly and yoke. Often, the same basic caster can be and is assembled with a variety of different plates, which are designed for a specific use and/or customer. Accordingly, the manufacturer must keep a large inventory of unassembled caster parts which must be assembled with the proper plates, each time an order is received for casters with the particular plates ordered. It is both inconvenient and uneconomical to run small quantities of such casters to fill specific orders. The present alternative is to stock supplies of casters assembled with each type of plate. Applicant's invention substantially overcomes this problem. Moreover, since most orders must be filled with a minimum of delay, the work load must depend largely and directly upon the volume of orders, which is obviously undesirable. Furthermore, the filling of a given order may be seriously delayed where the volume of orders is heavy. On the other hand, where the caster can be assembled in advance and only the plate must be added after the order is received, the inventory, delivery and work load problems are greatly reduced.

Accordingly, the objects of this invention have been:

(1) To provide a swivel mechanism having a king pin and bearing assembly for a swivel caster, which mechanism is stronger than existing mechanisms for the same or similar purposes and which, at the same time, is capable of performing satisfactorily all of the functions performed by existing caster constructions for the same general purposes.

(2) To provide a swivel mechanism, as aforesaid, which can be completely assembled in its finished form and delivered to an equipment manufacturer for installation upon his equipment and which can be installed without requiring the use of special tools.

(3) To provide a swivel mechanism, as aforesaid, which can be formed during its assembly with key means whereby the king pin can be locked against rotational movement with respect to the device which the caster supports, such key means being provided without any increase in the cost of forming the king pin as it is assembled with the swivel bearings.

(4) To provide a swivel mechanism, as aforesaid, which is capable of long, substantially maintenance free operation under conditions which would be considered severe, if not abusive, when applied to the swivel mechanism of existing casters for the same general purposes.

(5) To provide a swivel mechanism, as aforesaid, which has a pleasing appearance, and the bearing assemblies of which can be made substantially dust proof by adding annular seal means without any other physical modification of the swivel mechanism.

(6) To provide a swivel mechanism, as aforesaid, which can be assembled accurately and with a minimum of undesirable stresses and/or improper tolerances in its construction.

(7) To provide a method whereby the king pin is connected to the caster yoke at the same time that a portion of said king pin is shaped to secure the bearings with respect to the king pin and to provide lock means on the king pin for positively preventing its rotation with respect to the equipment to which it is to be secured.

Other objects and purposes of this invention will become apparent to persons familiar with this type of equipment upon reading the following descriptive material and examining the drawings, in which:

FIGURE 1 is a fragmentary, front elevational view of a swivel caster embodying the swivel mechanism of the invention.

FIGURE 2 is a sectional view taken along the line II—II in FIGURE 1 and including a mounting plate secured to the swivel mechanism.

FIGURE 3 is a sectional view taken along the line III—III in FIGURE 2.

FIGURE 4 is a broken fragment of FIGURE 2 shown in association with the dies for shaping the king pin as it is assembled with the bearings.

FIGURE 5 is a fragment of FIGURE 2 shown in association with the dies for shaping the king pin in a modified form.

FIGURE 6 is a fragment of FIGURE 5 after the swivel mechanism is assembled and secured to a mounting plate.

FIGURE 7 is a sectional view substantially as taken along the line VII—VII in FIGURE 6.

FIGURE 8 is a sectional view substantially as taken along the line VIII—VIII in FIGURE 7 and disclosing an alternate king pin construction.

For the purpose of convenience in description, the terms "upper," "lower," "front," "rear" and words of similar import will have reference to a caster construction embodying the invention as appearing in FIGURE 1, which shows a front view. The terms "inner," "outer" and derivatives thereof will have reference to the geometric center of the swivel mechanism and parts associated therewith.

General Construction

The objects and purposes of the invention, including those set forth above, have been met by providing a swivel mechanism including an antifriction bearing assembly engaged with the swivel plate of a caster yoke and connected to a king pin and by providing a method for shaping the king pin, as it is assembled with the bearing assembly, so that the bearing ball retainers are rigidly connected to said king pin. In a variation of this method, keys are formed on the king pin for locking same against rotation with respect to the device to which the king pin is to be secured and which is to be supported by the caster. The bearing ball retainers are disposed upon opposite sides of the swivel plate, and said retainers have axially elongated, central openings therethrough which diverge away from each other and away from the axis of the king pin. The king pin has one substantially conical and external flange receivable into the conical opening of one retainer ring. Another substantially conical and external flange is formed on the king pin during assembly thereof with the swivel mechanism so that said flange substantially fills the conical opening in the other ball retainer. The upper end of the king pin may be threaded for engagement by a nut for the purpose of securing the king pin, hence the caster, to the device upon which it is to be mounted for the purpose of supporting same.

Detailed Description

The swivel mechanism 10 (FIGURE 1), which has been selected to illustrate a preferred embodiment and the method of the invention, is disclosed herein as part of a swivel caster 11 having a yoke or horn 12 upon which a caster wheel is rotatably supported in a substantially conventional manner by means of a shaft 14. The yoke 12 has a swivel plate 17 with a circular, substantially flat portion 18 having a central opening 19 therethrough. The inner edge 22 of the central portion 18 defining the circular opening 19 is drawn upwardly to form an integral annular flange, the outer surface of which defines the inner race for the bearing balls 23 of the upper bearing 24.

The bearing balls 23 project upwardly above the flange 22 (FIGURE 2) where they are engaged by the lower surface of the ball retainer 27 adjacent the downwardly extending, annular flange 26 on the outer edge of said retainer 27. The ball retainer 27 has an integral, downwardly extending flange 28 concentric with the outer flange 26 and substantially smaller in diameter than the diameter of the flange 22. The inner flange 28 is formed so that it defines an upwardly diverging, substantially conical opening 29 having a minimum diameter which is approximately the same as the outside diameter of the shank 32 of the king pin or spindle 33.

The swivel mechanism 10 (FIGURE 2) includes a lower ball retainer 34 which supports the bearing balls 36 of the lower bearing 37 firmly against the lower surface of the central portion 18 on the swivel plate 17. The lower retainer 34 has an upwardly extending, integral flange 38 adjacent its outer edge which serves as an outer race for the balls 36. Said retainer 34 also has an upwardly extending, inner flange 40 which is sufficiently close to said outer flange 38 to act as an inner race. The lower portion 39 of said flange 40 converges upwardly to define a downwardly facing, conical surface which extends upwardly approximately to the plane defined by the lower surface of the central portion 18, where said conical surface has an inside diameter approximately equal to the diameter of the shank 32 on the king pin 33. Said flange 40 (FIGURE 2) has a cylindrical portion 42 integral with and extending upwardly from the upper edge of the conical portion 39. Said cylindrical portion 42 snugly embraces the shank 32 of the king pin 33 and the upper edge of said portion 42 engages the lower edge of the inner flange 28 approximately at the level of the upper edge of the flange edge 22 on said swivel plate 17.

The outer flanges 26 and 38 (FIGURE 2) on the retaining rings 27 and 34, respectively, are preferably coaxial and of approximately the same diameter. The inner flange 28 of retainer 27 and the cylindrical portion 42 of retainer 34 have substantially equal inside diameters and they are coaxial. Said inner flanges 28 and 42 are tightly held against each other when they are assembled with the bearing balls 23 and 36 on opposite sides of the swivel plate 17. However, at least one lubrication passageway 41 is provided between the zone defined within the inner flanges 28 and 40 and the zone disposed radially outwardly of these flanges. In this embodiment, the passageway 41 is formed by a radially disposed notch in the lower edge of the flange 28.

The king pin 33 (FIGURE 2) has at or near its lower end an annular external flange 43 having a conical radial surface 44 with substantially the same downward divergence as the divergence of the inner surface of the conical portion 39 of the retainer 34. Thus, the conical, radial surface 44 on the lower flange 43 is received into and snugly engages said conical portion 39 when the shank 32 extends through the cylindrical portion 42.

As shown in FIGURE 4, the shank 32 of the king pin 33 extends a short distance above the upper surface of the upper retainer 27. Said king pin 33 has an externally threaded portion 46 of substantially reduced diameter which forms a shoulder 47. The extreme lower end of the king pin 33 may be provided with an integral and out-of-round end portion 48, which may be in the form of a hexangular bolt head, whereby the pin 33 may be gripped while the swivel mechanism is being assembled.

The king pin 33 (FIGURE 4) has a lubrication opening 49 including a vertical portion 52 extending from a point within the shank 32 upwardly through the upper end of the king pin. A horizontal portion 53 of the lubrication opening 49 extends sidewardly from the lower end of the vertical portion 52 through the side wall of the shank 32 preferably at a point where it will communicate with the passageway 41 between the inner flanges 28 and 42. Thus, lubricant inserted into the upper end of the opening 49 can move downwardly and then sidewardly therethrough and then through the passageway 41 into the annular zone occupied by the bearing balls 23 and 36 between said ball retainers 27 and 34.

The parts of the swivel mechanism 10 (FIGURE 2), including the retainers 27 and 34, the bearing balls 23 and 26, the king pin 33 and the swivel plate 17, are permanently connected together by placing them in their assembled condition between the upper and lower die members 56 and 57 (FIGURE 4), and then effecting relative movement of said die members toward each other by conventional means, such as a press brake (not shown). The lower die 57 has a recess 58 into which the out-of-round end portion 48 of the king pin 33 is received so that both the lower end of the king pin 33 and the lower surface of the lower flange 43 thereon bear against and are firmly supported upon said lower die member 57.

The upper die member 56 (FIGURE 4) has a recess 59 into which the upper threaded portion 46 of said king pin 33 is slidably received. The diameter of the recess 59 is somewhat smaller than the diameter of the shank 32. Accordingly, when the upper and lower die members 56 and 57 are moved toward each other, the lower surface 62 of said die member 56 adjacent the recess 59 engages the shoulder 47 at the upper end of the shank 32 and forges it downwardly to form an integral and radial flange 63 which substantially fills the upwardly diverging opening 29 in the upper retainer 27. This forging operation creates a work hardened, rigid and radial extension of the king pin 33 which firmly holds the retainer 27 against the retainer 34. The forging operation also reduces the diameter of the portion 60 of the shank 32 which is immediately adjacent to the threaded portion 46, and is directly above the flange 63 after the flange is formed.

Relative movement of the upper and lower die members 56 and 57 toward each other is carefully controlled so that the inner flanges of the bearing ball retainers 27 and 34 will be snugly urged against each other, but the bearing balls 23 and 36 will be able to move freely in their races along the swivel plate 17 after the forging operation is completed.

As shown in FIGURE 2, the threaded portion 46 of the king pin may be inserted through an appropriate opening 66 in a mounting plate 67 until the portion 60 of the shank 62 is disposed in said opening 66 and the mounting plate 67 is bearing snugly against the flat upper surface of the upper retainer 27. The mounting plate 67 is thicker than the axial distance between the flange 63 and the threaded portion 46. Thus, the king pin 33 can be threadedly engaged by a nut 68 for rigidly holding same with respect to said mounting plate 67.

*Assembly and Operation*

A caster embodying the swivel assembly 10 of the invention is assembled as indicated in FIGURE 4 by placing the lower end portion 48 of the king pin 33 upon the upper end of the lower die member 57. The retainers 27 and 34, with the swivel plate 17 and the bearing balls 23 and 36 therebetween, are sleeved downwardly onto the shank 32 of the king pin 33.

The retainers 27 and 34 are shaped and hardened so that their inner flanges 28 and 42, respectively, are in snug engagement with each other when the proper clearance is provided between the bearing balls 23 and 36 and the parts of the swivel assembly 10 engaged thereby.

The upper die member 56 (FIGURE 4) is moved downwardly over the threaded end 46 of the king pin 33 so that the lower end of said die member 56 engages the shoulder 47 and forges or upsets said shoulder 47 downwardly into the conical opening 29 in the retainer 27 (FIGURE 2) to form the upper flange 63 on the king pin 33. When the flange 63 is thusly completed on the king pin 33, the retainers 27 and 34 and the king pin 33 are virtually unitized.

One of the small passageways 41 (FIGURES 2 and 4) in the lower edge of the inner flange 28 is arranged to communicate with the horizontal portion 53 of the lubrication opening 49. It will be apparent that these passageways can, alternatively or additionally, be provided in the upper edge of the inner flange 42 on the retainer 34.

The relative movement of the die members 56 and 57 is controlled so that the flange 63 is properly formed to unitize the retainers 27 and 34 with the king pin 33, without damaging the related parts of the mechanism 10 and without affecting adversely the operation of the completed mechanism 10. Thus, this forging operation is completed without causing dimples in the surfaces of the bearing retainers 27 and 34 or the swivel plate 17. It may be necessary to make one or both of the inner flanges 28 and 42 slightly oversized in axial extent to allow for the permanent set or compression of these flanges which may occur in some instances during the forging operation by which the flange 63 is formed.

The completed swivel assembly 10, with the caster, can now be easily secured to a mounting plate 67 (FIGURE 2) by inserting the threaded portion 46 of the king pin 33 through the opening 66 and engaging said pin 33 with a nut 68. The 360° engagement between the upper flange 63 and the upper retainer 27, as well as the 360° engagement between the lower flange 43 and the lower retainer 34 positively opposes and virtually prevents any rocking movement of either of the retainers 27 and 34 with respect to the king pin 33, even under conditions of operation which are now considered excessively severe. Thus, this construction eliminates the type of failure which presently results from the gradual loosening of the retaining rings under small loads over a long period of time. That is, small shocks or loads, which are normally encountered, simply will not loosen the secured parts of the swivel mechanism 10 from their unitized assembly.

*Modified Structure*

The modified upper die member 56a has near the lower end thereof a pair of notches 72 and 73 which communicate with diametrically opposite sides of the recess 59a adjacent the lower end thereof. Accordingly, when the upper die member 56a is moved toward the lower die member 57a, the portion of the shoulder 47a adjacent the notches 72 and 73 is undisturbed by the forging or shearing operation. As a result, the upper flange 75 (FIGURE 7), which is formed on the king pin 33a by the upper die 56a, has two separate arcuate segments 76 and 77. The undisturbed portions of the shoulder 47a (FIGURE 5), disposed between the segments 76 and 77 (FIGURE 7), form axially elongated keys 78 and 79 on diametrically opposite sides of the king pin 33a at the upper end of the shank 32a. The reduction in the amount of surface engagement between the flange 75 and the upper retainer 27a which results from the separation between the segments 76 and 77, does not materially alter in swivel mechanism 10a (FIGURE 6) the unitized effect and its resistance to normal loads, which are discussed above with respect to the swivel mechanism 10.

The integral keys 78 and 79 are slidably receivable into key ways 82 and 83 in diametrically opposite sides of the king pin opening 84 in the mounting plate 86, which may otherwise be similar to the mounting plate 67. The engagement of said keys within said key ways positively prevents relative rotation between the king pin 33a and the mounting plate 86 around the axis of the king pin 33a. The swivel mechanism 10a is secured against axial movement with respect to the mounting plate 86 by means of a nut 68a.

The mounting plate 86 (FIGURE 6), as well as the mounting plate 67 may, for example, be part of the frame structure of a castered dolly, such as that shown in my United States patent application Serial No. 860,243, filed December 17, 1959.

An annular sealing element 88 (FIGURE 6) may be provided in the swivel mechanism 10a between the lower edge of the outer flange 26 on the upper retainer 27 and the adjacent surface on the swivel plate 17. A similar sealing element 89 may be provided between the upper edge of the outer flange 38 on the retainer 34 and the opposing surface of the swivel plate 17. The sealing elements 88 and 89 not only serve to prevent leakage of lubricant from within the zone defined between the retainers 27 and 34, but also serve to prevent the entry of dust, dirt and lint into said zone.

FIGURE 8 illustrates a modified king pin 92, the upper end 93 of which is of relatively short axial length and has a smooth surface. A pair of keys 94 and 95 are formed in the upper end of the shank 97 on said king pin 92 when the upper flange 98 is formed thereon by a forging operation, as discussed above with respect to the king pin 33a. The king pin 92, hence its associated swivel mechanism 99, is connected to the mounting plate 102 by forcing the upper end 93 of the king pin 92 downwardly and sidewardly against the upper surface 103 of the mounting plate 102. The swivel mechanism 99 is particularly suited for use in a plate type caster construction.

The presence of the swivel mechanism 99, and particularly the bearings therein, makes it undesirable to apply excessive pressures to the opposite ends of the king pin 92 when the upper end 93 is moved against the plate 102. However, by using heat and pressure, the amount of pressure required to mash the upper end 93 against the plate 102 can be reduced substantially below a value which would damage the swivel mechanism. Moreover, the particular construction of the swivel mechanism increases its resistance to such damage.

Although particular preferred embodiments of the invention have been disclosed above for illustrative purposes, it will be understood that variations or modifications of such disclosure, which come within the scope of the appended claims, are fully contemplated.

What is claimed is:

1. A king pin and bearing construction for a swivel caster having a swivel plate with a central opening therethrough, comprising:

first and second annular bearing ball retainers disposed upon opposite sides of and spaced from the swivel plate, said retainers having annular and coaxial flange means adjacent their inner edges, said flange means extending toward each other and firmly limiting movement of said retainers toward each other, one of said flange means having a substantially cylindrical portion and both of said flange means having portions defining openings having walls diverging away from the swivel plate;

a plurality of bearing balls disposed between said retainers on opposite sides of said swivel plate for snug rolling engagement with said retainers and said swivel plate;

means on said swivel plate and said retainers for holding said bearing balls in annular paths substantially concentric with said flange means;

a king pin having a central portion snugly disposed within said flange means and said cylindrical portion, said king pin having a pair of spaced, annular flange portions near the opposite ends of said central portion, said flange portions having outer surfaces converging toward each other and of substantially the same shape as and snugly received into the openings in said flange means, whereby relative axial movement of said first and second retainers is positively opposed.

2. A king pin and bearing construction for a swivel caster having a swivel plate with a central opening therethrough, comprising:

plate with a central opening therethrough, comprising:

first and second annular bearing ball retainers disposed upon opposite sides of and spaced from the swivel plate, said retainers having annular and coaxial flange means adjacent their inner edges, said flange means extending toward each other and firmly abutting each other through the opening in the swivel plate, one of said flange means having a substantially cylindrical portion and both of said flange means having portions defining substantially conical openings having walls diverging away from the swivel plate;

a plurality of bearing balls disposed between said retainers on opposite sides of said swivel plate for snug rolling engagement with said retainers and said swivel plate;

means on said swivel plate and said retainers for holding said bearing balls in annular paths substantially concentric with said flange means;

a king pin having a central portion snugly disposed within the abutting portions and cylindrical portion of said flange means, and having a pair of spaced conical portions with outer surfaces converging toward each other and snugly received into the conical openings in said flange means, whereby relative axial movement of said first and second retainers is positively opposed, said king pin having a coaxial end portion projecting beyond one of said conical portions.

3. A king pin and bearing construction for a swivel caster having a swivel plate with a central opening therethrough, comprising:

an integral annular flange on said swivel plate adjacent said central opening and extending away from said swivel plate on one side thereof;

a first annular, ball retainer having integral, annular and coaxial flanges adjacent the inner and outer edges thereof and extending therefrom toward said one side of said swivel plate, the inner annular flange defining a substantially conical opening diverging away from said swivel plate;

a plurality of bearing balls snugly and rotatably disposed between said swivel plate and said first retainer snugly adjacent the flange on said swivel plate and the outer flange on said first retainer;

a second annular, ball retainer having integral, annular and coaxial flanges adjacent the inner and outer edges thereof and extending toward said first retainer, the inner flange on said second retainer having a first portion defining a conical opening diverging away from said swivel plate and a second portion extending from said first portion into said central opening and defining a cylindrical opening;

a plurality of bearing balls snugly and rotatably disposed between said swivel plate and said second retainer snugly adjacent the outer flange thereof and the first portion of the inner flange thereof, said first and second retainers being spaced from each other and from said swivel plate; and a king pin having near one end thereof a conical portion converging away from said one end of said king pin and snugly receivable into the conical opening in the first portion of the second retainer, said king pin having a central cylindrical portion snugly receivable into the second portion of said second retainer and having a second substantially conical portion integral therewith and spaced from said first conical portion, said second conical portion being snugly receivable into said conical opening in said first retainer, whereby movement of said first and second retainers axially with respect to each other is positively prevented, said king pin having a portion at its other end projecting beyond said second conical portion thereof.

4. A structure according to claim 3 wherein the second retainer is on the bottom side of the swivel plate;

wherein said king pin has a pair of radially outwardly projecting, integral keys on diametrically opposite sides of said projecting portion adjacent the second conical portion of said king pin; and wherein said projecting portion of said king pin is threaded outwardly of said keys.

5. In a swivel caster construction including a swivel plate having bearing ball retainers on opposite sides thereof, each retainer having an opening therethrough coaxial with said swivel plate opening, bearing balls rollingly supporting said swivel plate between and upon said retainers for swivelling movement with respect to said retainers, and a king pin extending through said openings and secured to said retainers, the improvement in means for securing said king pin to said retainers comprising:

wall means adjacent said openings in said retainers defining annular and axially extending inner surfaces diverging away from said swivel plate and from their common axis;

means on said king pin defining a pair of spaced and substantially annular outer surfaces converging toward each other and toward the axis of said pin, said outer surfaces being in snug engagement with said inner surfaces to positively prevent movement of said retainers away from each other; and means positively preventing movement of said wall means toward each other when said surfaces are in said snug engagement.

6. In a method for assembling a caster spindle for non-rotatable engagement with a mounting member having a circular opening with a pair of key ways therein, and for simultaneously assembling said king pin with a pair of coaxial bearing ball retainers having abutting inner flanges, said kingpin having an end portion of reduced diameter defining an annular shoulder and an integral, conical portion spaced from and converging toward the reduced end portion of said king pin, said inner flanges of said bearing ball retainers defining conically shaped openings diverging away from each other, the steps comprising:

inserting the reduced end portion of the king pin completely through both of said retainer rings so that said conical portion is snugly disposed within the conical opening in one of the retainers and the shoulder is spaced from the adjacent surface of the other retainer;

effecting an axial movement of said shoulder toward said conical portion and, simultaneously deforming said shoulder to form a pair of integral, arcuate enlargements on diametrically opposite sides of said king pin adjacent the other retainer and snugly disposed within the conical opening in said other retainer so that said retainers are positively and firmly held against each other and with respect to said king pin;

simultaneously forming a pair of radially outwardly projecting keys on diametrically opposite sides of the king pin, said keys being disposed respectively between the opposite ends of said arcuate enlargements;

inserting the reduced end portion of said king pin through said opening in said mounting member so that said keys on said king pin are snugly disposed within the said keyways and said reduced portion extends beyond said mounting member; and securing said end portion with respect to said mounting member whereby said king pin is positively held against axial and rotational movement with respect to said mounting member.

7. A king pin and bearing construction for a swivel caster which includes a yoke having a swivel plate with a central opening therethrough, comprising:

bearing ball retaining means including first and second, annular bearing ball retainers disposed upon opposite sides of and spaced from the swivel plate, and substantially cylindrical spacing means extending coaxially between said retainers near the radially inner edges thereof to limit movement of said retainers toward each other, the radially inner edge portion of the first ball retainer having a radially inner surface defining a frustrum of a cone converging toward the second ball retainer;

a plurality of bearing balls disposed between said ball retainers on opposite sides of said swivel plate for snug rolling engagement with said ball retainers and said swivel plate;

means on said swivel plate and said ball retainers for holding said bearing balls in annular paths substantially concentric with said cylindrical means;

a king pin having a central portion snugly disposed within said cylindrical means and having first and second spaced and radially projecting, annular flanges near the opposite ends of said central portion, the first annular flange having a radially outer, conical surface converging toward said central portion at the same angle as said conical inner surface for snug engagement with said conical inner surface, and the second annular flange on said king pin being engaged with the axially outer surface of the second ball retainer, relative axial movement of said first and second retainers being positively opposed by said spacing means and said annular flanges, said king pin extending axially beyond said second annular flange and away from said central portion.

8. A king pin and bearing construction for a swivel caster having a swivel plate with a central opening therethrough, comprising:

bearing ball retaining means including first and second, annular and coaxial bearing ball retainers disposed upon opposite sides of and spaced from the swivel plate, and spacing means extending between said retainers near their radially inner edges to limit movement of said retainers toward each other, the radially inner edge portion of the first ball retainer having a radially inner surface defining a frustrum of a cone converging toward the second ball retainer;

a plurality of bearing balls disposed between said ball retainers on opposite sides of said swivel plate for snug rolling engagement with said ball retainers and said swivel plate;

means on said swivel plate and said ball retainers for holding said bearing balls in annular paths substantially concentric with said ball retainers;

a king pin having a central portion extending through said ball retainers and adjacent said spacing means, said king pin having first and second, radially projecting, annular flanges near the opposite ends of said central portion, the first annular flange having a conical outer surface converging toward said central portion and sloped for snug engagement with the conical inner surface of said first ball retainer, said second annular flange on said king pin being engaged with the second ball retainer, relative axial movement of said ball retainers being positively opposed by said spacing means and said annular flanges.

9. A king pin and bearing construction for a swivel caster which includes a yoke having a swivel plate with a central opening therethrough, comprising:

bearing ball retaining means including first and second, annular bearing ball retainers disposed upon opposite sides of and spaced from the swivel plate, and substantially cylindrical spacing means extending coaxially between said retainers near the radially inner edges thereof to limit movement of said retainers toward each other, the radially inner edge portion of the first ball retainer having a radially inner surface substantially defining a frustrum of a cone converging toward the second ball retainer;

a plurality of bearing balls disposed between said ball retainers on opposite sides of said swivel plate for snug rolling engagement with said ball retainers and said swivel plate;

means on said swivel plate and said ball retainers for holding said bearing balls in annular paths substantially concentric with said cylindrical means;

a king pin having a central portion snugly disposed within said cylindrical means and having a radially projecting, annular flange near one end of said king pin and near one end of said central portion, said annular flange having a radially outer surface converging toward said central portion at substantially the same angle as said conical inner surface for snug engagement therewith;

plate means having an opening through which the other end of said king pin is received so that said plate means engages the axially outer surface of the second ball retainer; and annular means on said king pin near the other end of said central portion for holding said plate means tightly against said second ball retainer whereby axial movement of said first and second retainers is positively opposed by said spacing means, said annular flange and said annular means.

10. A structure according to claim 9 wherein said plate means has keyway means in the surface thereof defining the opening therethrough, and wherein said king pin has integral key means snugly received into said keyway means when said plate means is held by said annular means tightly against said second ball retainer.

11. A king pin and bearing construction for a swivel caster which includes a yoke having a swivel plate with a central opening therethrough, comprising:

bearing ball retaining means including first and second, annular bearing ball retainers disposed upon opposite sides of and spaced from the swivel plate, and substantially cylindrical spacing means on one of said retainers extending coaxially between said retainers near the radially inner edges thereof to limit movement of said retainers toward each other, the radially inner edge portion of the first ball retainer having a radially inner surface substantially defining a frustrum of a cone converging toward the second ball retainer;

a plurality of bearing balls disposed between said ball retainers on opposite sides of said swivel plate for snug rolling engagement with said ball retainers and said swivel plate;

means on said swivel plate and said ball retainers for holding said bearing balls in annular paths substantially concentric with said cylindrical means;

a king pin having a central portion snugly disposed within said cylindrical means and the adjacent portions of said retainers, said king pin having a radially projecting, annular flange near one end thereof and of said central portion, said annular flange having a radially outer, conical surface converging toward said central portion at substantially the same angle as said conical inner surface for snug engagement therewith;

annular flange means projecting radially from said king pin near the other end of said central portion; and plate means having an opening therethrough in which the other end of said king pin is snugly disposed, said flange means, said spacing means and said annular flange being arranged and relatively positioned to hold said plate means tightly against said second ball retainer and to oppose relative axial movement of said first and second retainers.

12. A structure according to claim 11 wherein said plate means has keyway means in the surface defining said opening therethrough and said king pin has integral key means snugly received in said keyway means when said flange means is holding said plate means tightly against said second retainer.

13. A king pin and bearing construction for a swivel caster having a swivel plate with a central opening therethrough, comprising:

bearing ball retaining means including first and second, annular and coaxial bearing ball retainers disposed upon opposite sides of and spaced from the swivel plate, and spacing means sleeved upon the king pin and extending between said retainers near their radially inner edges to limit movement of said retainers toward each other, the radially inner edge portion of the first ball retainer having a radially inner surface substantially defining a frustrum of a cone converging toward the second ball retainer;

a plurality of bearing balls disposed between said ball retainers on opposite sides of said swivel plate for snug rolling engagement with said ball retainers and said swivel plate;

means on said swivel plate and said ball retainers for engaging and holding sad bearing balls in axially offset and arcuate paths of constant radius and substantially concentric with the axis of said ball retainers;

a king pin having a central portion extending through said ball retainers and through said spacing means, said king pin having first and second, radially projecting and annular flanges near the opposite ends of said central portion, the first annular flange having a conical outer surface converging toward said central portion and sloped for snug engagement with the conical inner surface of said first ball retainer, said second annular flange on said king pin being engaged with the second ball retainer, relative axial movement of said ball retainers being positively opposed by said spacing means and said annular flanges.

14. A king pin and bearing construction for a swivel caster having a swivel plate with a central opening therethrough, comprising:

bearing ball retaining means including first and second, annular and coaxial bearing ball retainers disposed upon opposite sides of and spaced from the swivel plate, and spacing means sleeved upon the king pin and extending between said retainers near their radially inner edges to limit movement of said retainers toward each other, the radially inner edge portion of the first ball retainer being offset toward said second ball retainer so that said inner edge portion has a radially inwardly facing surface converging toward the second ball retainer and located radially outwardly of said radially inner edge of said first ball retainer;

a plurality of bearing balls disposed between said ball retainers on opposite sides of said swivel plate for snug rolling engagement with said ball retainers and said swivel plate;

means including axially offset surfaces on said swivel plate and said ball retainers for holding said bearing balls in spaced annular paths substantially concentric with said ball retainers;

a king pin having a central portion extending through said ball retainers and through said spacing means, said king pin having first and second, radially projecting and annular flanges near the opposite ends of said central portion, the first annular flange having a radially outer surface converging toward said central portion and snugly engaging substantially throughout its length said inwardly facing surface of said first ball retainer, said second annular flange on said king pin being engaged with an axially outer surface on the second ball retainer, so that relative axial movement of said ball retainers is positively opposed by said spacing means and said annular flanges.

15. A king pin and bearing construction for a swivel caster which includes a yoke having a swivel plate with a central opening therethrough, comprising:

bearing ball retaining means including first and second, annular and coaxial bearing ball retainers disposed upon opposite sides of and spaced from the swivel plate, and spacing means sleeved upon the king pin and extending between said retainers near the radially inner edges thereof to limit movement of said retainers toward each other, said first and second ball retainers having axially outer surfaces on the radially inner edge portions thereof, the axially outer surface on the inner edge portion of said first ball retainer converging toward the second ball retainer;

a plurality of bearing balls disposed between said ball retainers on opposite sides of said swivel plate for snug rolling engagement with said ball retainers and said swivel plate;

means including axially offset surfaces on said swivel plate and said ball retainers for holding said bearing balls in spaced annular paths substantially concentric with said spacing means;

a king pin having a central portion snugly disposed within said spacing means, and having spaced, first and second, radially projecting and substantially annular flanges near the opposite ends of said central portion, the first annular flange being at one end of said king pin and having a surface converging toward said central portion and snugly engaged with said axially outer surface on said first ball retainer, and the second annular flange having a surface engaged with said axially outer surface of the second ball retainer, so that relative axial movement of said first and second retainers is positively opposed by said spacing means and said annular flanges, said king pin extending axially beyond said second annular flange and away from said central portion; and a pair of radially outwardly projecting, integral keys on diametrically opposite sides of the extension of said king pin adjacent the second annular flange of said king pin.

16. A king pin and bearing construction for a swivel caster which includes a yoke having a swivel plate with a central opening therethrough, comprising:

bearing ball retaining means including first and second, annular bearing ball retainers disposed upon opposite sides of and spaced from the swivel plate, said bearing ball retainers having radially inner portions snugly engaging each other and defining a coaxial, substantially cylindrical opening through said ball retainers, the radially inner portion of the first ball retainer being axially offset toward the second ball retainer to define an axially outer surface converging toward said second ball retainer;

a plurality of bearing balls disposed between said ball retainers on opposite sides of said swivel plate for snug rolling engagement with said ball retainers and said swivel plate;

means including axially offset surfaces on said swivel plate and said ball retainers for engaging and holding said bearing balls in axially offset, arcuate paths of constant radius and substantially concentric with the central axis of said cylindrical opening;

a king pin having a central portion snugly disposed within said cylindrical opening and having spaced, first and second, radially projecting and substantially annular flanges near the opposite ends of said central portion, the first annular flange being at one end of said king pin and having a surface converging toward said central portion and snugly engaged with said axially outer surface on said inner portion of said first ball retainer, and the second annular flange on said king pin having two arcuate portions engaged with the axial surface on said inner portion of the second ball retainer, so that relative axial movement of said first and second ball retainers is positively opposed by the snug engagement of said radially inner portions with each other and with said annular flanges, said king pin extending axially beyond said second annular flange and away from said central portion; and a pair of radially outwardly projecting, integral keys on diametrically opposite sides of the extension of said king pin adjacent the second annular flange thereon, said keys being located between said arcuate portions of said second annular flange.

References Cited in the file of this patent

UNITED STATES PATENTS

| | | |
|---|---|---|
| 2,914,340 | Black | Nov. 24, 1959 |
| 2,986,746 | Jackson | June 6, 1961 |
| 2,986,767 | Rice et al. | June 6, 1961 |

UNITED STATES PATENT OFFICE
CERTIFICATE OF CORRECTION

Patent No. 3,142,085            July 28, 1964

John W. Black

It is hereby certified that error appears in the above numbered patent requiring correction and that the said Letters Patent should read as corrected below.

Column 7, line 73, strike out "plate with a central opening therethrough, comprising:"; column 12, line 14, for "sad" read -- said --.

Signed and sealed this 9th day of February 1965.

(SEAL)
Attest:

ERNEST W. SWIDER
Attesting Officer

EDWARD J. BRENNER
Commissioner of Patents